June 9, 1931.  J. T. DUNNIGAN  1,809,161
AUTO SLED ATTACHMENT
Filed Nov. 12, 1928

Jos. Thos. Dunnigan,
INVENTOR.

Patented June 9, 1931

1,809,161

UNITED STATES PATENT OFFICE

JOSEPH THOMAS DUNNIGAN, OF DETROIT, MICHIGAN

AUTO SLED ATTACHMENT

Application filed November 12, 1928, Serial No. 318,816, and in Canada March 28, 1928.

This invention relates to auto sled attachments designed particularly to overcome the difficulties occasioned by snowed in or uneven road beds over which a motor vehicle is required to travel.

A further object is to provide auxiliary wheels which will afford double traction on the road bed, to overcome the digging in of the single pair of traction wheels and at the same time will contact with any unevenness in the road bed.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application.

Like numerals of reference designate corresponding parts.

Figures 1, 2:
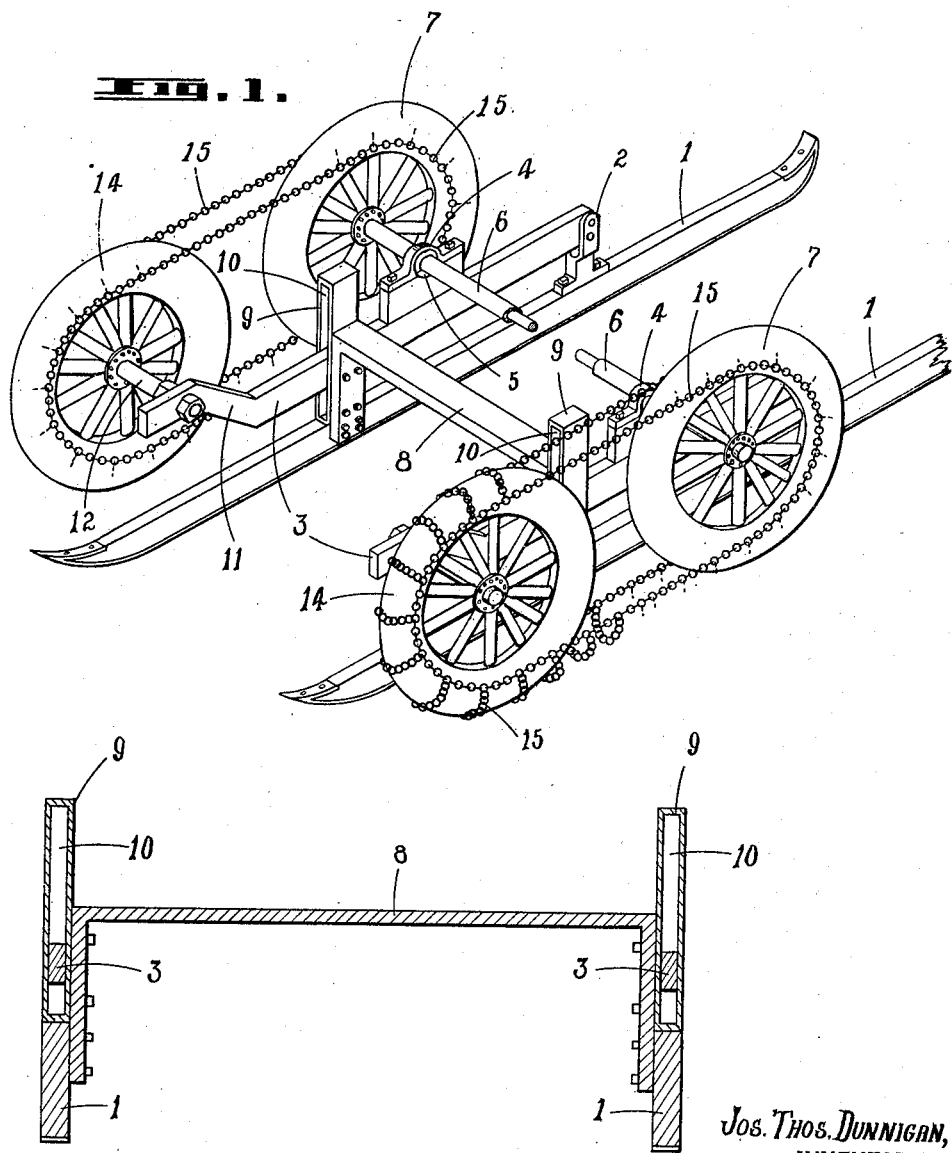
Fig. 1 illustrates a perspective side view of the preferred embodiment of my invention.
Fig. 2 is a transverse sectional view of the U-shaped cross brace with its associate parts as attached to the runners.

1 indicates the runners, which are shown in the present application as of ordinary conventional type. I have not shown spacing members to brace the front and rear ends of these runners in parallel relationship to each other, as braces of any desired type convenient for the particular purpose may be used if so desired and found necessary. 2 indicates a standard secured at its lower end to the runner 1, the upper end of which is bifurcated to pivotally support the forward end of the connecting bar 3. Each runner is provided with one of these standards and a connecting bar. Adjacent the forward end of the connecting bar 3, I provide a split bearing 4, adapted to be clamped over a suitable bearing block 5 mounted on the axle housing 6 near the inner face of each of the ordinary traction wheels 7. This will permit of oscillation of the bearing 4 on the bearing block 5. Rearwardly of the axle housing 6, I provide an inverted U-shaped cross brace 8, having its ends connected to the runners 1. Each end of this brace is provided with a guide member 9, extending upwardly in parallel alignment with its respective end portion of the brace 8 and extending upwardly above the main or cross portion thereof. Each guide member 9 has a longitudinal slot as at 10 through which its respective connecting bar 3 is extended and is free to move up or down. At the same time the guide member 9 prevents twisting of the connecting bar.

The rear end of each connecting bar 3 is preferably offset in an upward direction as at 11 and is provided with an outwardly directed stub shaft 12, on which an auxiliary wheel 14 is mounted. 15 indicates a traction tread chain of any suitable design, which may be used in connection with the construction shown in this disclosure. It is preferably provided with side members and cross connecting members such as are commonly used on pneumatic tires to provide traction, the only difference being that the chain is much longer so as to extend in beltwise form around the sets of wheels 7 and 14 and thus provides a means for driving the auxiliary wheel 14 in unison with the wheel 7.

From the construction hereinbefore described, taken in combination with the annexed drawings, it will be appreciated that I provide an auto sled as an auxiliary attachment for motor vehicles which can be easily and quickly attached when required. The rear axle housing may be raised and the forward ends of the runners 1 extended under the housing until the bearing 4 is directly under the bearing block 5, which has been properly positioned on the axle housing 6. The top part of the bearing is then clamped over the bearing block 5. The chains 15 are then placed in position over their respective sets of wheels 7 and 14, after which, the vehicle with its auxiliary sled attachment, is ready for use.

When the auxiliary attachment is in position as shown in the drawings, the weight of the vehicle is on the axle housing 6, which is supported on the connecting bars 3, the forward end of which is pivotally supported in the standards 2 on the runners 1, while the rear end is supported from its respective auxiliary wheel 14. On level road beds both wheels 7 and 14 will contact therewith with equal traction, but if the surface of the road bed has any depth of loose snow, the runners will carry most of the weight of the vehicle and the traction wheels 7 with their auxiliary wheels 14 co-acting together and will sink into the snow to a sufficient depth to afford proper traction contact therewith by means of the chains 15. In my construction, the wheels 7 and the auxiliary wheels 14 are mounted in such a manner as to permit independent movement on the respective side of the vehicle according to the unevenness of the road bed.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

An auto sled for vehicles provided with a pair of runners; a suitable brace connecting said runners; each end of said brace being provided with a guide plate; vertical standards supported from said runners; connecting bars, having their forward ends pivotally connected to the upper ends of said standards; means for connecting the axle housing of a vehicle adjacent the forward ends of said connecting bars; the upward movement of said connecting bars being limited by said guide plates; auxiliary tracting wheels mounted from the rear end of said connecting bars and a traction tread chain extending beltwise around each respective auxiliary wheel and its co-acting traction wheel.

In testimony whereof, I affix my signature.

JOSEPH THOMAS DUNNIGAN.